(12) United States Patent
Sun

(10) Patent No.: US 8,141,266 B2
(45) Date of Patent: Mar. 27, 2012

(54) WIRE LENGTH MEASUREMENT DEVICE

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/954,658

(22) Filed: Nov. 25, 2010

(65) Prior Publication Data

US 2011/0277332 A1 Nov. 17, 2011

(30) Foreign Application Priority Data

May 11, 2010 (CN) .......................... 2010 1 0169046

(51) Int. Cl.
*G01B 3/04* (2006.01)

(52) U.S. Cl. ................. 33/755; 33/759; 33/768; 33/770

(58) Field of Classification Search .................... 33/755, 33/758–760, 768, 770, 776
See application file for complete search history.

(56) References Cited

U.S. PATENT DOCUMENTS

| | | | | | |
|---|---|---|---|---|---|
| 1,339,896 | A | * | 5/1920 | Kemper | 33/512 |
| 1,784,888 | A | * | 12/1930 | Couture | 33/2 R |
| 2,686,366 | A | * | 8/1954 | Berkovic | 33/758 |
| 4,247,099 | A | * | 1/1981 | Pandak | 33/755 |
| 4,868,990 | A | * | 9/1989 | Steinberg | 33/15 |
| 4,875,296 | A | * | 10/1989 | Holzmeister et al. | 33/770 |
| 6,401,350 | B2 | * | 6/2002 | Ford | 33/562 |
| 6,640,460 | B1 | * | 11/2003 | Nabarro et al. | 33/759 |
| 6,868,619 | B1 | * | 3/2005 | Boren et al. | 33/760 |
| 7,249,423 | B2 | * | 7/2007 | Sieber | 33/512 |
| 7,685,727 | B2 | * | 3/2010 | Sieber | 33/512 |
| 7,905,028 | B2 | * | 3/2011 | Sieber | 33/512 |
| 2002/0166254 | A1 | * | 11/2002 | Liebermann | 33/759 |
| 2005/0011082 | A1 | * | 1/2005 | Smith | 33/758 |

* cited by examiner

*Primary Examiner* — Yaritza Guadalupe-McCall
(74) *Attorney, Agent, or Firm* — Altis Law Group, Inc.

(57) ABSTRACT

A length measurement device comprises a first connector, a measurement wire, and a second connector. The second connector comprises a substrate and a fixer pivotally connected to the substrate. The measurement wire is an electrical wire with a scale. One end of the measurement wire is connected to the first connector, and another end is movably connected to the substrate of the second connector and the fixer.

15 Claims, 6 Drawing Sheets

WIRE LENGTH MEASUREMENT DEVICE

BACKGROUND

1. Technical Field

The present application is related to length measurement devices, especially to a length measurement device for measuring length of an electrical wire.

2. Description of Related Art

In conventional computer wiring, a measuring tape is usually used to measure a required length of an electrical wire. However, a common electrical wire generally does not comprise the length of a connector, and is difficult to be bent. Therefore, a measuring tape cannot measure the required length of an electrical wire precisely. A new length measurement device overcoming the limitations described is desired.

DETAILED DESCRIPTION

Figure 1:
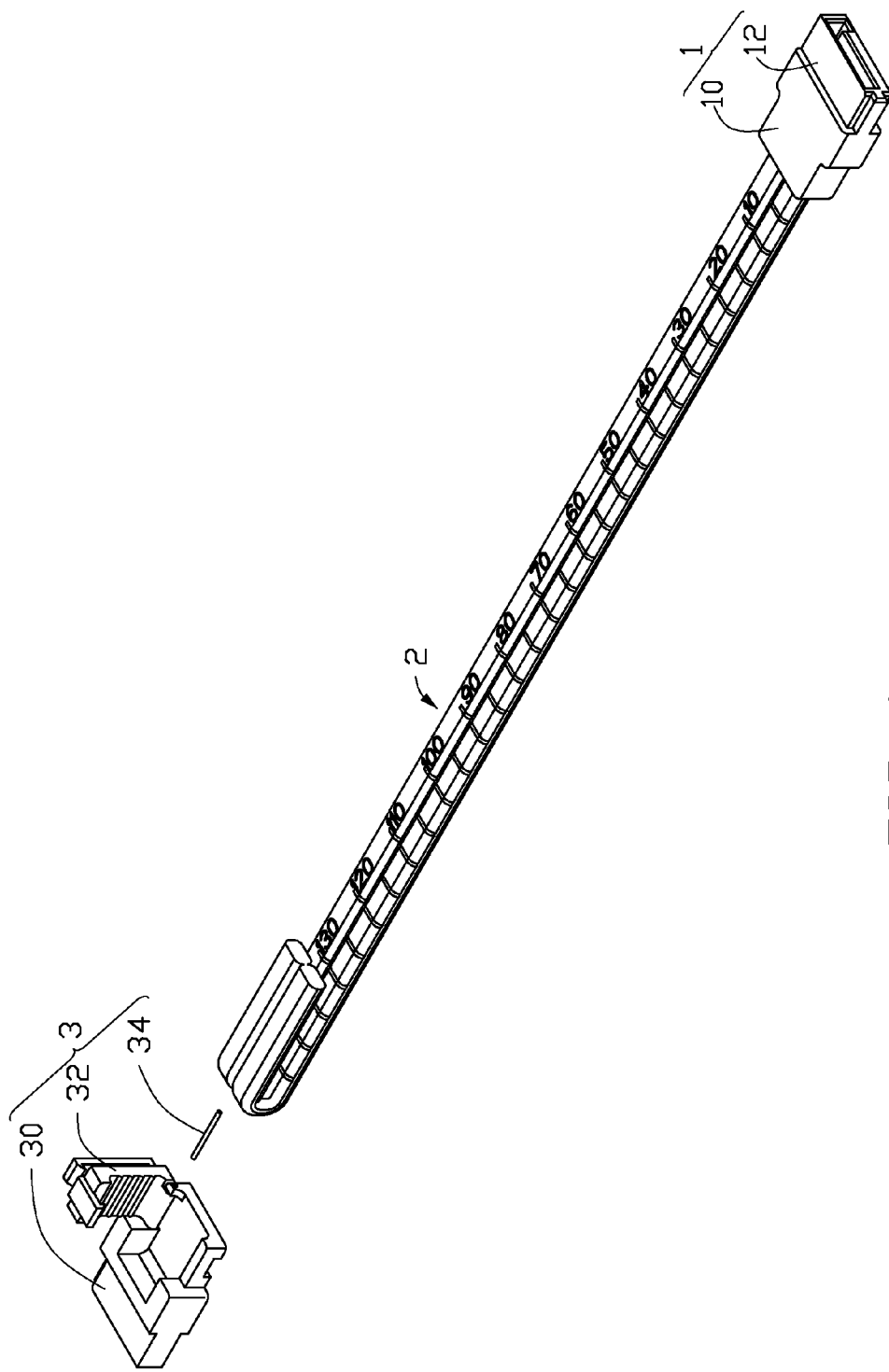
FIG. 1 is an exploded perspective view of a length measurement device of one embodiment of the present application.

Referring to FIG. 1, one embodiment of a length measurement device of the present application comprises a first connector 1, a measurement wire 2, and a second connector 3. The first connector 1 comprises a wiring part 10 connected to one end of the measurement wire 2, and a first connector body 12. The connector body 12 has no electrical properties, and can be connected to an electrical device, such as a hard disk. The measurement wire 2 is a wire with a scale.

Figure 3:
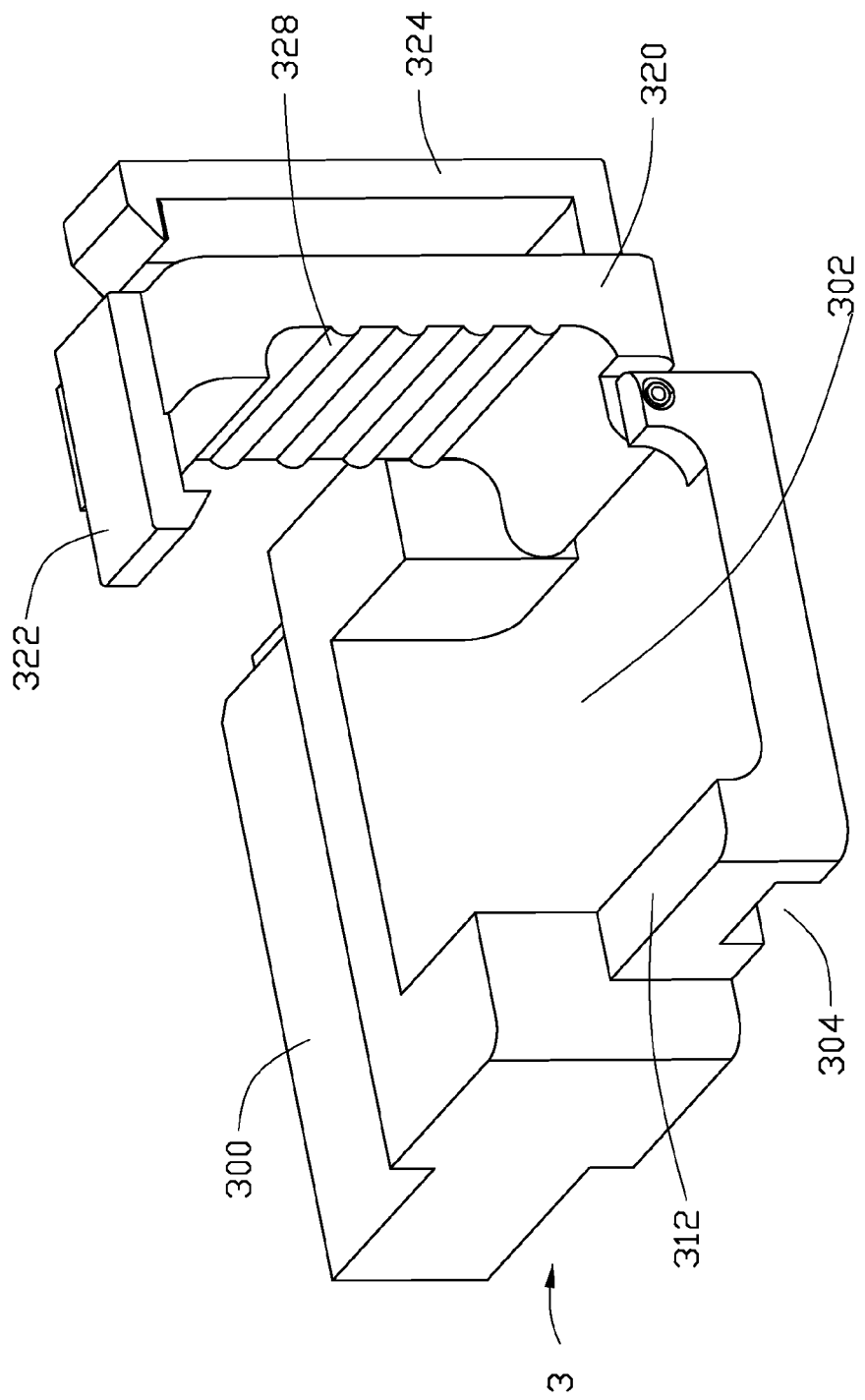
FIG. 3 is a partially enlarged view of a second connector of FIG. 1.
Figure 4:
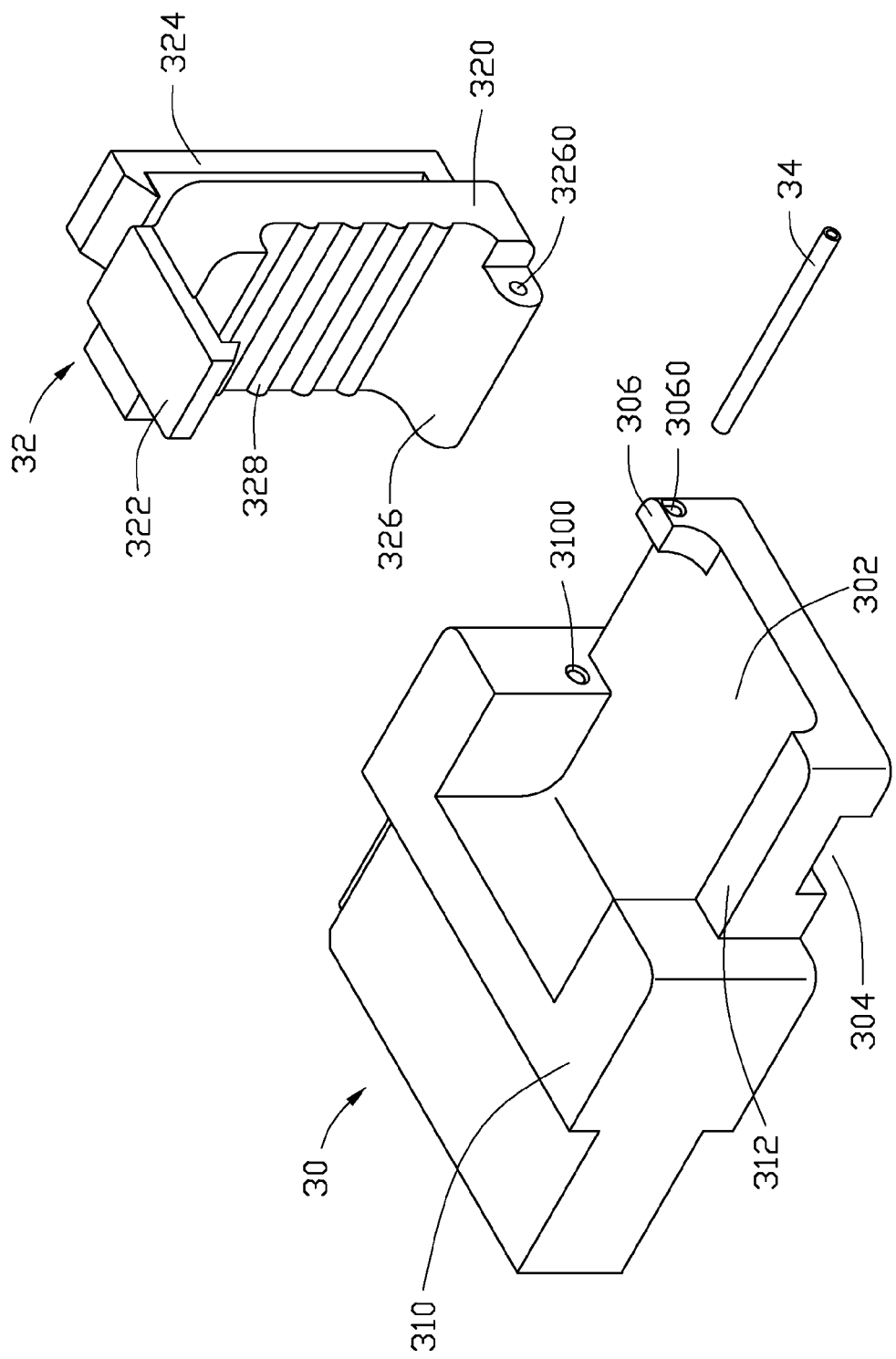
FIG. 4 is an exploded view of the second connector in FIG. 1.

Referring FIG. 3 and FIG. 4, the second connector 3 comprises a substrate 30 and a fixer 32. The substrate 30 comprises a second connector body 300 without electrical properties, a receiving part 302 and a protruding part 310 formed between the second connector body 300 and the receiving part 302. The protruding part 310 is substantially configured as a U shape, and has an opening towards the receiving part 302. A latch part 306 is provided on one side of the receiving part 302, away from the protruding part 310. A first through hole 3060 is defined in the center of the latch part 306. A second through hole 3100 is provided on one side of the protruding part 310, opposite to the first through hole 3060. A first bar 312 is provided on another side of the receiving part 302, which is opposite to the side the latch part 306 provided thereon. A recess 304 is defined under the bottom of the first bar 312.

The fixer 32 comprises a line fixing part 320, and a clip 324 provided on one side of the fixer 32. The clip 324 is configured for having an opening formed as U shape towards the line fixing part 320. A hook 322 is provided on one end of the line fixing part 320, and is configured for clipping the recess 304 provided below the receiving part 302. The clip 324 and the hook 322 are flexible. A second bar 326 is formed on another end of the line fixing part 320, opposite to the hook end. The second bar 326 comprises a third through hole 3260, corresponding to the first through hole 3060 and the second through hole 3100. Several recesses 328 are provided on an inner side of the line fixing part 320, under the clip side.

A pin 34 passes through the first through hole 3060 of the line fixing part 302, and the third through hole 3260 of the fixer 32, received in the second through hole 3100 of the protruding part 310, such that the fixer 32 is pivotally positioned on the substrate 30.

Figure 2:
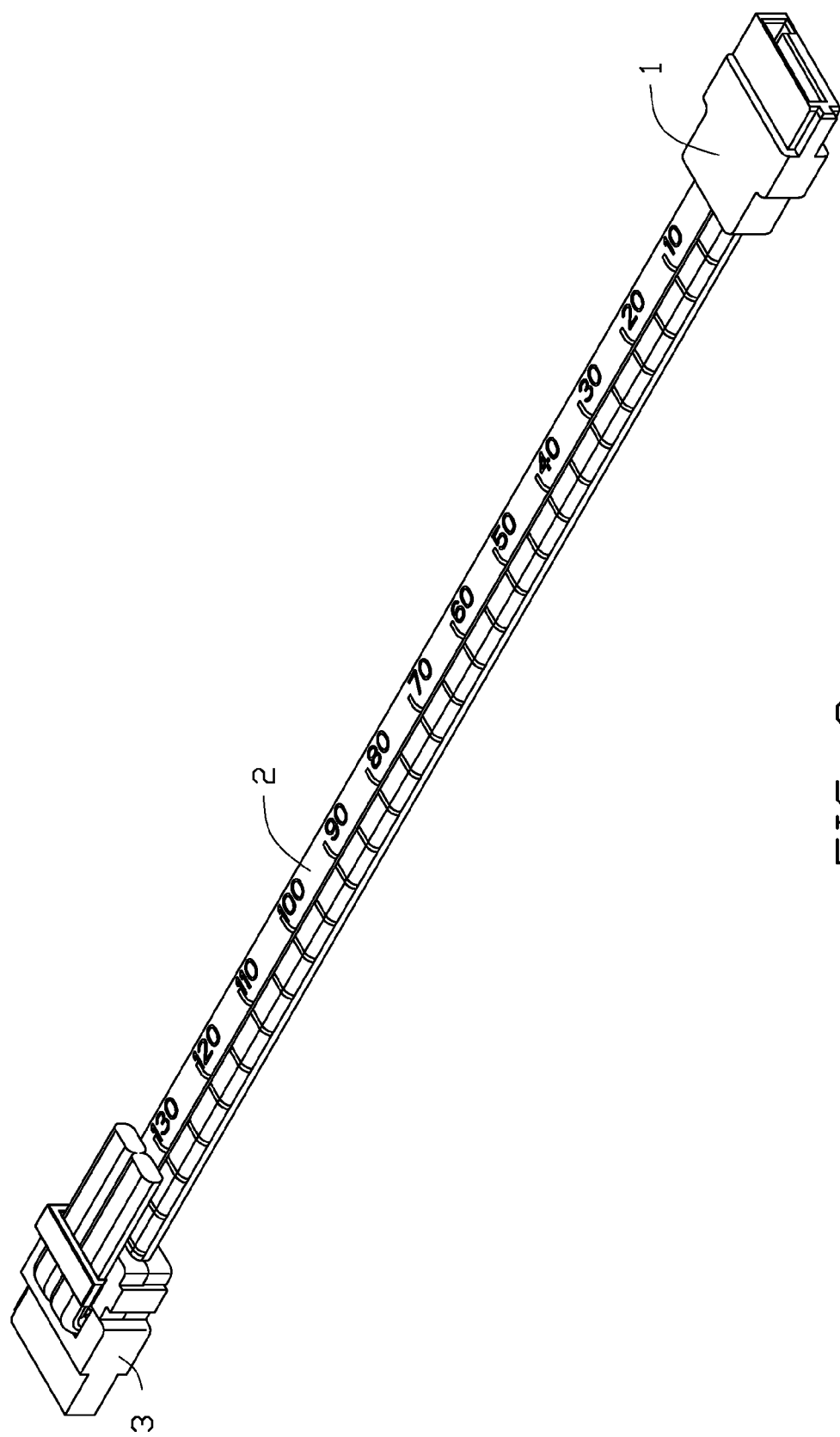
FIG. 2 is an assembled perspective view of FIG. 1.

Referring to FIG. 2, the connector body 12 of the first connector 1 of the measurement wire 2 is connected to an electrical device. The second connector body 300 of the second connector 3 is received in another electrical device. Another end of the measurement wire 2 is disposed at the receiving part 302 of the second connector 3, and bent upwards from the protruding part 310. The fixer 32 is rotated to the receiving part 302, and the hook 322 received in the recess 304. The recesses 328 press the measurement wire 2. The measurement wire 2 then passes through a gap between the clip 324 and the fixing part 320. The scale of the measurement wire 2 indicated by fixer 32 provides the measured length for a wire to be connected between the first and second connectors 1 and 3a.

Figure 5:
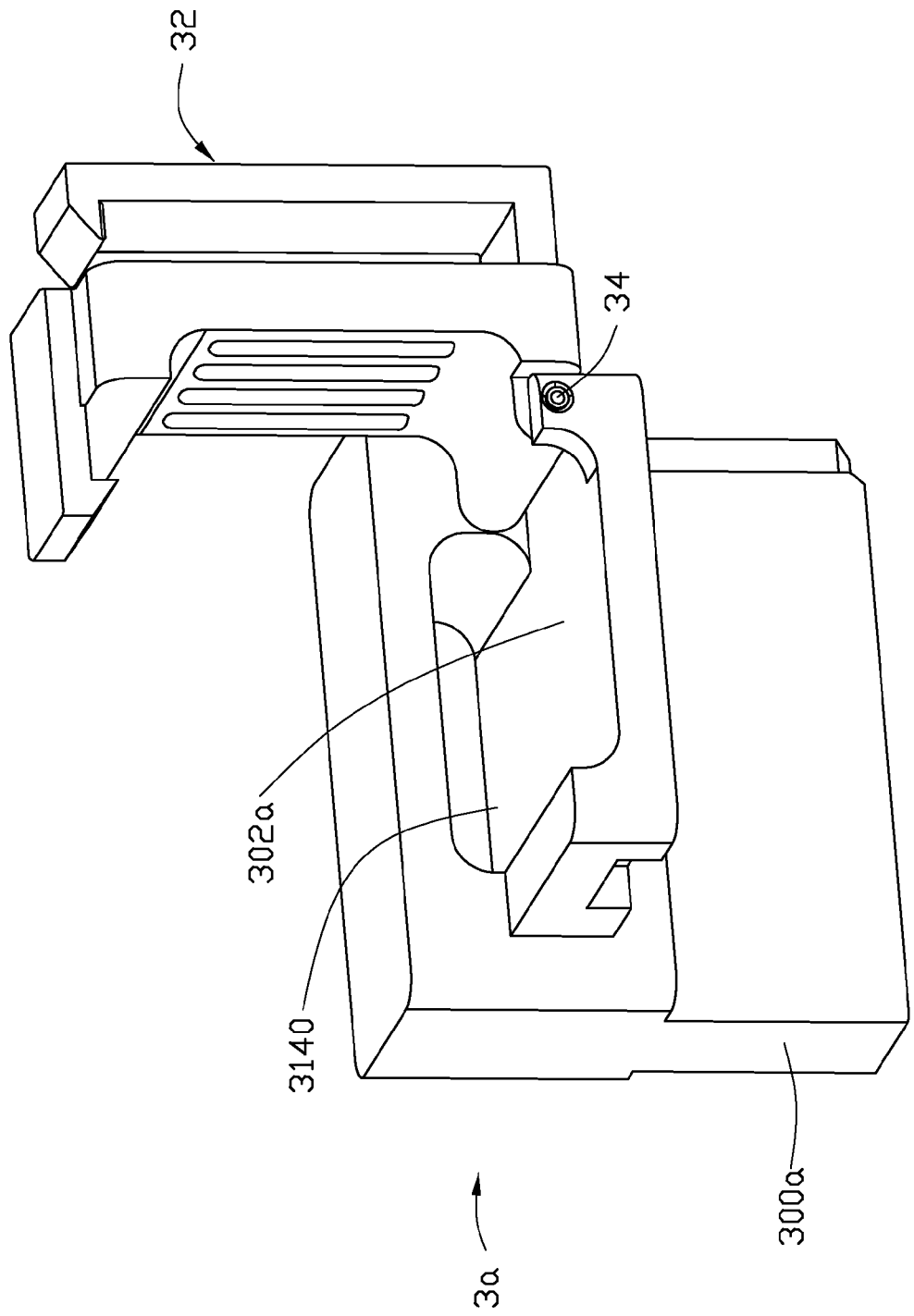
FIG. 5 is an enlarged perspective view of a second connector of a second embodiment of a length measurement device of the present application.
Figure 6:
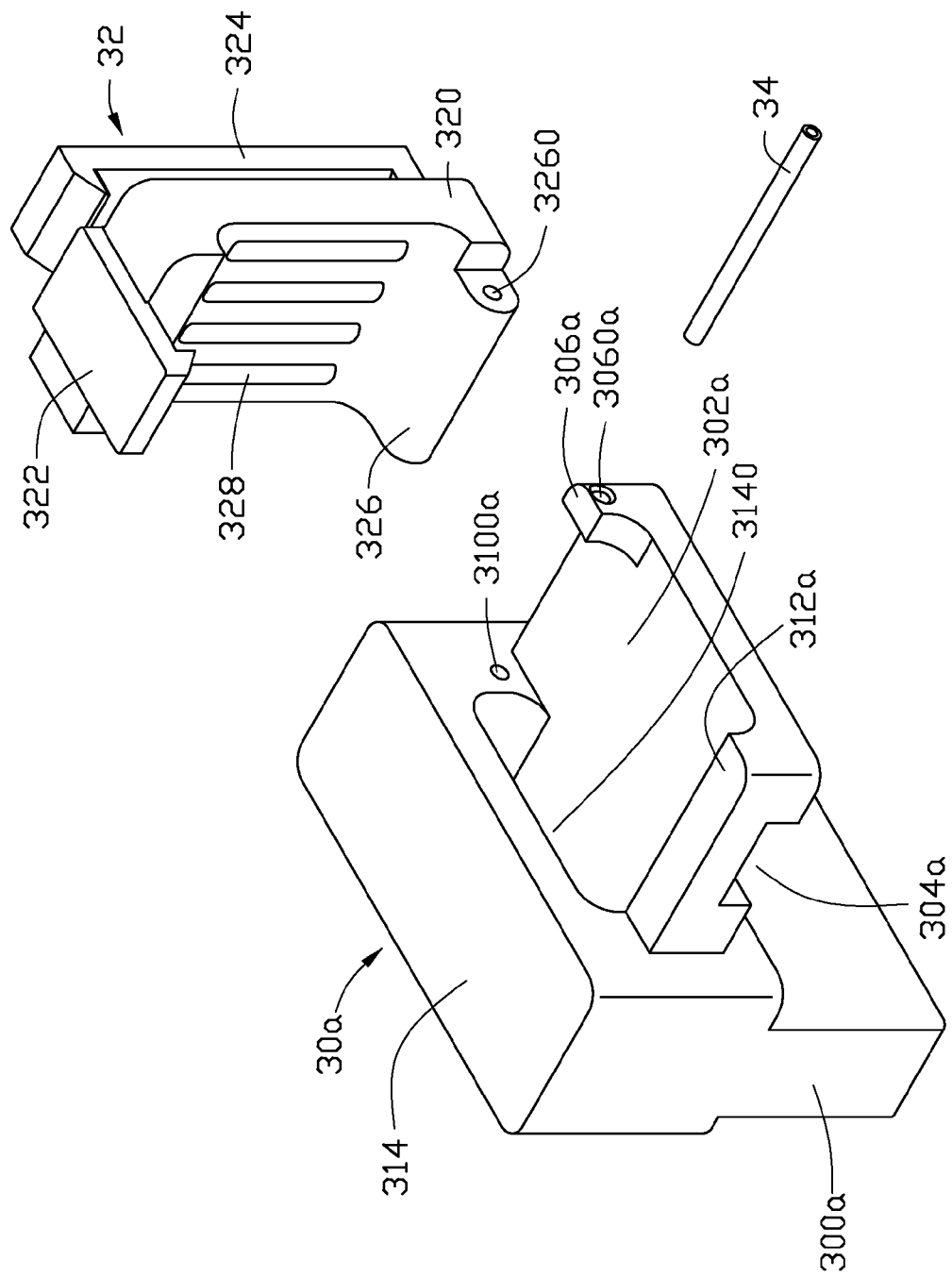
FIG. 6 is an exploded, perspective view of the second connector in FIG. 5.

Referring to FIG. 5 and FIG. 6, a second embodiment of the present application is similar to the first embodiment, differs from the first embodiment only in a second connector 3a replacing the second connector 3. The second connector 3a comprises a substrate 3a, and a fixer 32. The substrate 3a comprises a connector body 300a, a back wall 314 and a receiving part 302a connected vertically to the back wall 314, approximating to the connector body 300a. A cavity 3140 is provided in the center of the back wall 314, communicating with the receiving part 302a. A latch part 306a is provided on one side of the receiving part 302a, away from the back wall 314. A first through hole 3060a is defined in the center of the latch part 306a. A second through hole 3100a is provided on one side of the back wall 314, towards the first through hole 3060a. A first bar 312a is provided on another side of the receiving part 302 A recess 304a is defined under the bottom of the first bar 312.

A pin 34 is configured for passing through the first through hole 3060a of the line fixing part 302a, and the third through hole 3260 of the fixer 32, and is received in the second through hole 3100a of the back wall 314. Therefore, the fixer 32 can be pivotally provided on the substrate 30a.

In this embodiment, the connector body 12 of the first connector 1 of the measurement wire 2 is connected to an electrical device. The second connector body 300a of the second connector 3a is received in another electrical device. Another end of the measurement wire 2 is disposed on the receiving part 302a of the second connector 3a, and passes through the cavity 3140 of the back wall 314. The fixer 32 is rotated to the receiving part 302a, and the hook 322 received in the recess 304. The recesses 328 are configured for pressing the measurement wire 2. The measurement wire 2 passes through the cavity 3140 of the back wall 314, and is bent upward. The bent measurement wire 2 passes through the gap between the clip and the line fixing part 320. The scale of the measurement wire 2 indicated by fixer 32 shows the measured length of a wire to be connected between the first and second connectors 1 and 3a.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A length measurement device, comprising:
a first connector;
a second connector comprising a substrate and a fixer pivotally connected to the substrate;
a measurement wire with a scale;
wherein one end of the measurement wire is connected to the first connector, and the second connector is to movably fix the measurement wire between the substrate of the second connector and the fixer to measure the length of a wire needed for connecting between the first and second connectors; and
wherein the first connector comprises a wiring part and a first connector body without electrical properties, and one end of the measurement wire is connected to the wiring part of the first connector.

2. The length measurement device as claimed in claim 1, wherein the measurement wire is an electrical wire.

3. The length measurement device as claimed in claim 1, wherein the substrate comprises a second connector body without electrical properties, a receiving part and a fixing part, one end of the fixing part is rotatably connected to one end of the receiving part.

4. The length measurement device as claimed in claim 3, wherein a recess is formed below the receiving part, and a clip is formed on another end of the fixing part to clip with the recess.

5. The length measurement device as claimed in claim 4, wherein a plurality of protruding bars is formed under the line fixing part.

6. The length measurement device as claimed in claim 3, wherein the fixer further comprises a flexible clip provided on the one side of the fixer, configured in an opening towards the line fixing part.

7. The length measurement device as claimed in claim 3, wherein the substrate further comprises a protruding part provided between the second connector body and the receiving part, substantially configured as a U shape opening towards the receiving part.

8. The length measurement device as claimed in claim 3, wherein a latch part is provided on one side of the receiving part, away from the protruding part, and a first through hole is defined in the center of the latch part, and a second through hole is provided on one side of the protruding part, opposite to the first through hole.

9. The length measurement device as claimed in claim 8, wherein a bar is formed on another end of the line fixing part, opposite to the end on which the hook is provided; the bar comprises a third through hole, configured for corresponding to the first through hole and the second through hole.

10. The length measurement device as claimed in claim 9, wherein a pin passes through the first through hole of the line fixing part, and the third through hole of the fixer, and fastens on the second through hole of the protruding part, to pivotally connect the fixer to the substrate.

11. The length measurement device as claimed in claim 9, wherein the substrate further comprises a back wall, in the center of which a cavity is provided, communicating with a receiving part connected vertically to the back wall, which approximates to the connector body.

12. The length measurement device as claimed in claim 11, wherein a latch part is provided on one side of the receiving part, away from the back wall, a first through hole is defined in the center of the latch part, and a second through hole is provided on one side of the back wall, opposite to the first through hole.

13. The length measurement device as claimed in claim 11, wherein a bar is formed on another end of the line fixing part, opposite to the end on which the hook is provided; the bar comprises a third through hole, configured for corresponding to the first through hole and the second through hole.

14. The length measurement device as claimed in claim 11, wherein a pin passes through the first through hole of the line fixing part, and the third through hole of the fixer, and fastens on the second through hole of the protruding part, to pivotally connect the fixer to the substrate.

15. The length measurement device as claimed in claim 9, wherein the substrate further comprises a back wall, in the center of which a cavity is provided, communicating with a receiving part connected vertically to the back wall, which approximates to the connector body.

* * * * *